United States Patent [19]
Naba

[11] Patent Number: 5,808,752
[45] Date of Patent: Sep. 15, 1998

[54] TWO-SIDED IMAGE READING APPARATUS INCLUDING FIRST AND SECOND PARALLEL DATA COMPRESSION MEANS

[75] Inventor: Takashi Naba, Kawasaki, Japan

[73] Assignee: Canon Kabushiki Kaisha, Tokyo, Japan

[21] Appl. No.: 675,191

[22] Filed: Jul. 3, 1996

[30] Foreign Application Priority Data

Jul. 5, 1995 [JP] Japan .................................. 7-191004

[51] Int. Cl.⁶ .................................................. H04N 1/41
[52] U.S. Cl. ........................ 358/426; 358/406; 358/474; 382/232
[58] Field of Search .................................. 358/471, 474, 358/498, 426, 406; 382/312, 319, 232; 399/17, 38, 45

[56] References Cited

U.S. PATENT DOCUMENTS

| | | | |
|---|---|---|---|
| 4,568,983 | 2/1986 | Bobick | 358/409 |
| 4,908,719 | 3/1990 | Nonoyama | 358/474 |
| 4,949,189 | 8/1990 | Ohmori | 358/498 |
| 5,280,545 | 1/1994 | Masuda | 382/284 |
| 5,303,070 | 4/1994 | Christ | 358/474 |
| 5,610,826 | 3/1997 | Whetsel | 364/487 |
| 5,654,703 | 8/1997 | Clark, II | 341/51 |

*Primary Examiner*—Edward Tso
*Assistant Examiner*—Derek J. Jardieu
*Attorney, Agent, or Firm*—Fitzpatrick, Cella, Harper & Scinto

[57] ABSTRACT

An image reading apparatus disclosed in this invention has first and second line sensors. The output from the first line sensor is compressed by a first compression circuit, and the output from the second line sensor is compressed by a second compression circuit. Furthermore, control is made to output image data for one page compressed by the first compression circuit, and thereafter, to output image data for one page compressed by the second compression circuit. The first compression circuit can operate at a higher speed than the second compression circuit.

8 Claims, 6 Drawing Sheets

TWO-SIDED IMAGE READING APPARATUS INCLUDING FIRST AND SECOND PARALLEL DATA COMPRESSION MEANS

BACKGROUND OF THE INVENTION

1. Field of the Invention

The present invention relates to an image reading apparatus for reading images on both the front and back sides of an original, compressing read image data in correspondence with the front and back sides, and outputting the compressed image data.

2. Related Background Art

As a conventional image reading apparatus for optically reading images on both the front and back sides of an original, an arrangement shown in FIGS. 1 and 2 is known. FIG. 1 is a view showing an original feeding unit and an image reading unit of an image reading apparatus, and FIG. 2 is a schematic block diagram showing the arrangement of the apparatus. Referring to FIG. 1, an original 5-1 is fed by two pairs of front and rear feed rollers 5-2a and 5-2b, and 5-2c and 5-2d, and images on the front and back sides of the original are respectively illuminated with light emitted by lamps 5-4a and 5-4b via reading windows 5-3a and 5-3b of reading guides 5-3. Light beams reflected by the illuminated images are imaged on CCD sensors 5-6a and 5-6b as linear sensors via lenses 5-5a and 5-5b, and are output as image signals 5-a and 5-b.

As shown in FIG. 2, these image signals 5-a and 5-b representing lines on the front and back sides are synthesized to one line by a synthesizing circuit 5-7, and the synthesized image signal is converted into a digital signal by an analog-to-digital (A/D) conversion circuit 5-8. Thereafter, the digital signal is subjected to processing such as shading correction, γ correction, edge emphasis, and the like in an image processing circuit 5-9. The processed digital signal is then converted into a binary signal representing two values (black and white) by a binarizing circuit 5-10.

The converted signal is converted into parallel data corresponding to the bus width of a central processing unit (to be referred to as a "CPU" hereinafter) 5-15 by a serial-to-parallel (S/P) conversion circuit 5-11. The converted image data on the front and back sides of the original is temporarily stored in an image memory 5-12, and thereafter, is sequentially read out from the memory 5-12. The readout image data is compressed by an image compression circuit 5-13. The compressed data is transferred to a processing apparatus (not shown) such as a computer connected to the image reading apparatus via an output circuit 5-14. These circuits for performing data transfer and an original feeding unit driving circuit 5-16 are controlled by the CPU 5-15.

With the above arrangement, since the read image data are sequentially compressed and output, it is possible to compress and output image data at the time of reading an original. However, in the image memory 5-12, the compression processing of image is not always synchronized with the input processing of image data. Also, the processing speed of the computer or the like that receives the output from the image reading apparatus may be low, and the compression processing of image data must often be stopped. Therefore, the image reading apparatus must cope with these cases.

The conventional method of compressing image data representing lines on the front and back sides as one line data is advantageous for a case wherein the relationship between the front and back sides is important like in a check since image data on the front and back sides are not handled separately. However, it is often convenient for a normal document to independently process the front and back sides of the document since the front and back sides of the document serve as the first and second pages. In this case, image data on the front and back sides are preferably compressed separately.

However, in the conventional arrangement, when image data on the front and back sides are to be separately compressed and output, if image data on the front side is to be output first, image data of all the lines on the front side is required to output compressed data of all the lines on the front side. Therefore, the entire image on the front side of an original must be read. Since image data on the back side can be compressed only after the compression processing of image data on the front side has been completed, the processing time is prolonged to twice as that for one side.

SUMMARY OF THE INVENTION

It is an object of the present invention to provide an image reading apparatus which can compress and output a read original image within a short period of time.

In order to achieve the above object, according to an embodiment of the present invention, there is provided an image reading apparatus comprising a first line sensor, a second line sensor, first compression means for compressing an output from the first line sensor, second compression means for compressing an output from the second line sensor, and control means for controlling to output image data for one page compressed by the first compression means, and thereafter, to output image data for one page compressed by the second compression means, wherein the first compression means can operate at a higher speed than the second compression means.

According to another embodiment, there is provided an image reading apparatus for reading images on two sides of an original, comprising first compression means for compressing image data on the side, to be output first, of the original, and second compression means for compressing image data on the side, to be output next, of the original.

There is also provided an image reading apparatus for reading images on two sides of an original, comprising compression means for simultaneously compressing image data on the side to be output first and image data on the side to be output next by multitask processing, and storage means for storing the image data on the side to be output next.

With the above arrangement, read image data can be compressed and output within a short period of time.

Other objects and features of the present invention will become apparent from the following description of the specification taken in conjunction with the accompanying drawings.

DESCRIPTION OF THE PREFERRED EMBODIMENTS

Figure 1:
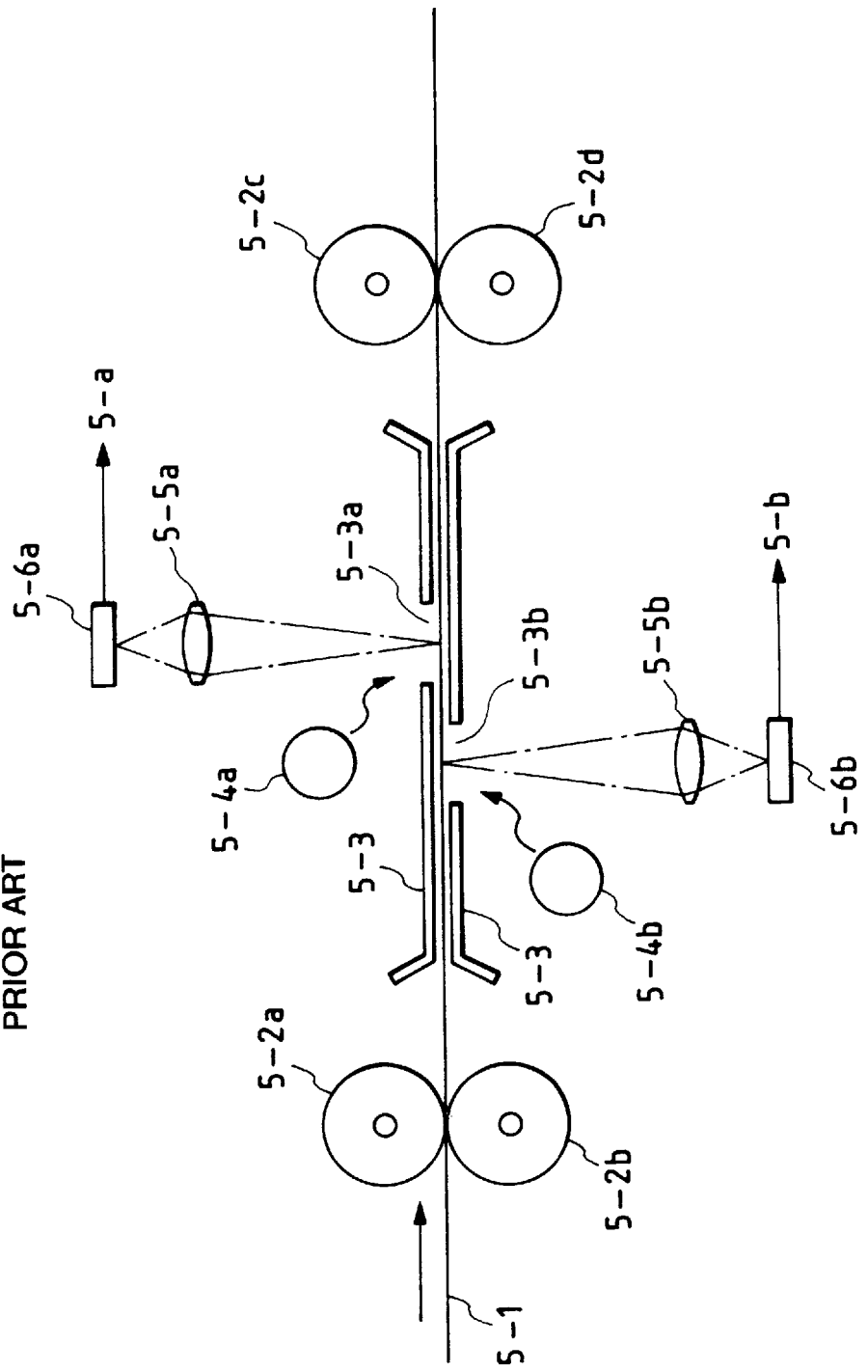
FIG. 1 is a view showing an original feeding unit and an image reading unit in an image reading apparatus.
Figure 2:
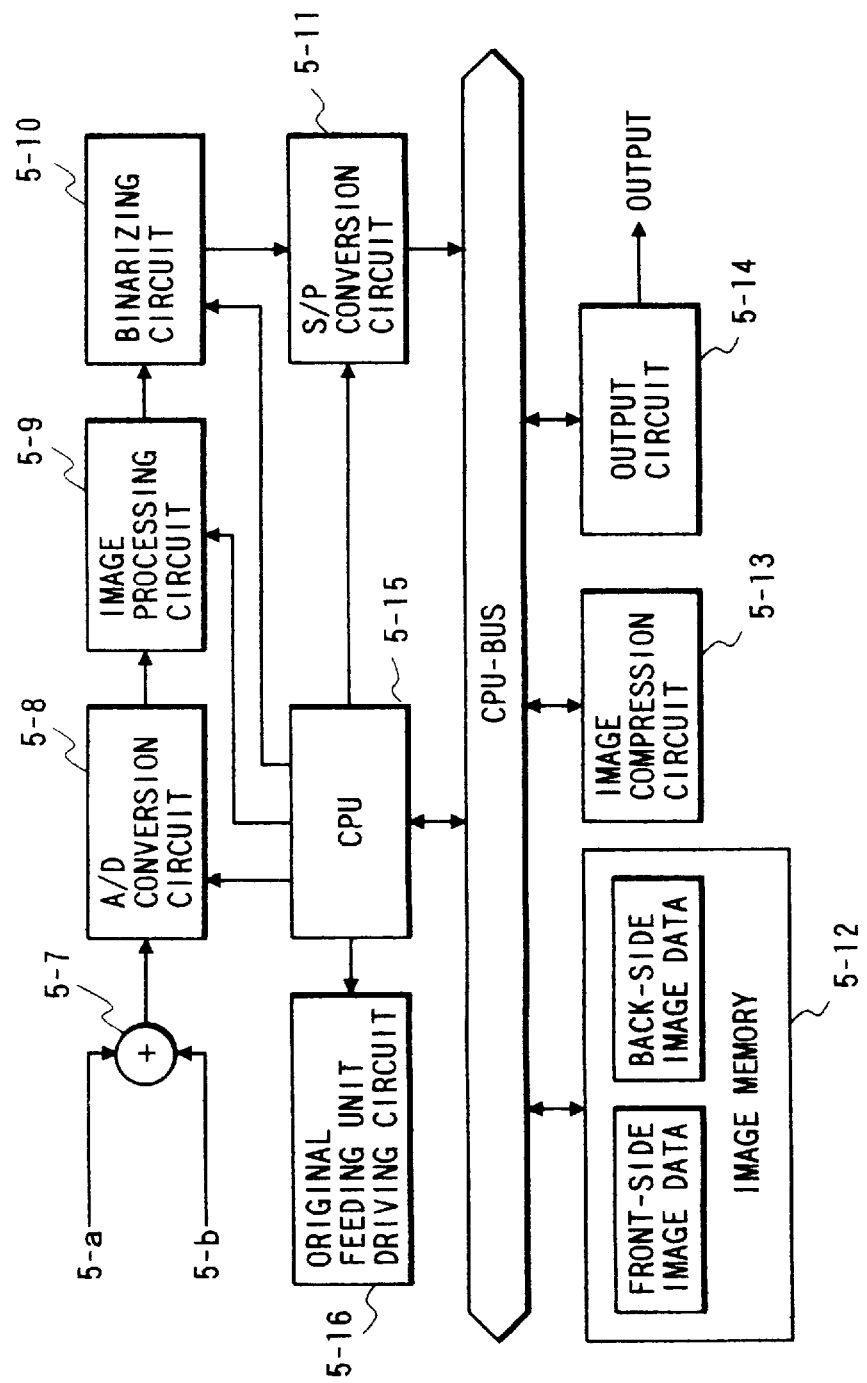
FIG. 2 is a block diagram showing the arrangement of a conventional image reading apparatus.
Figure 3:
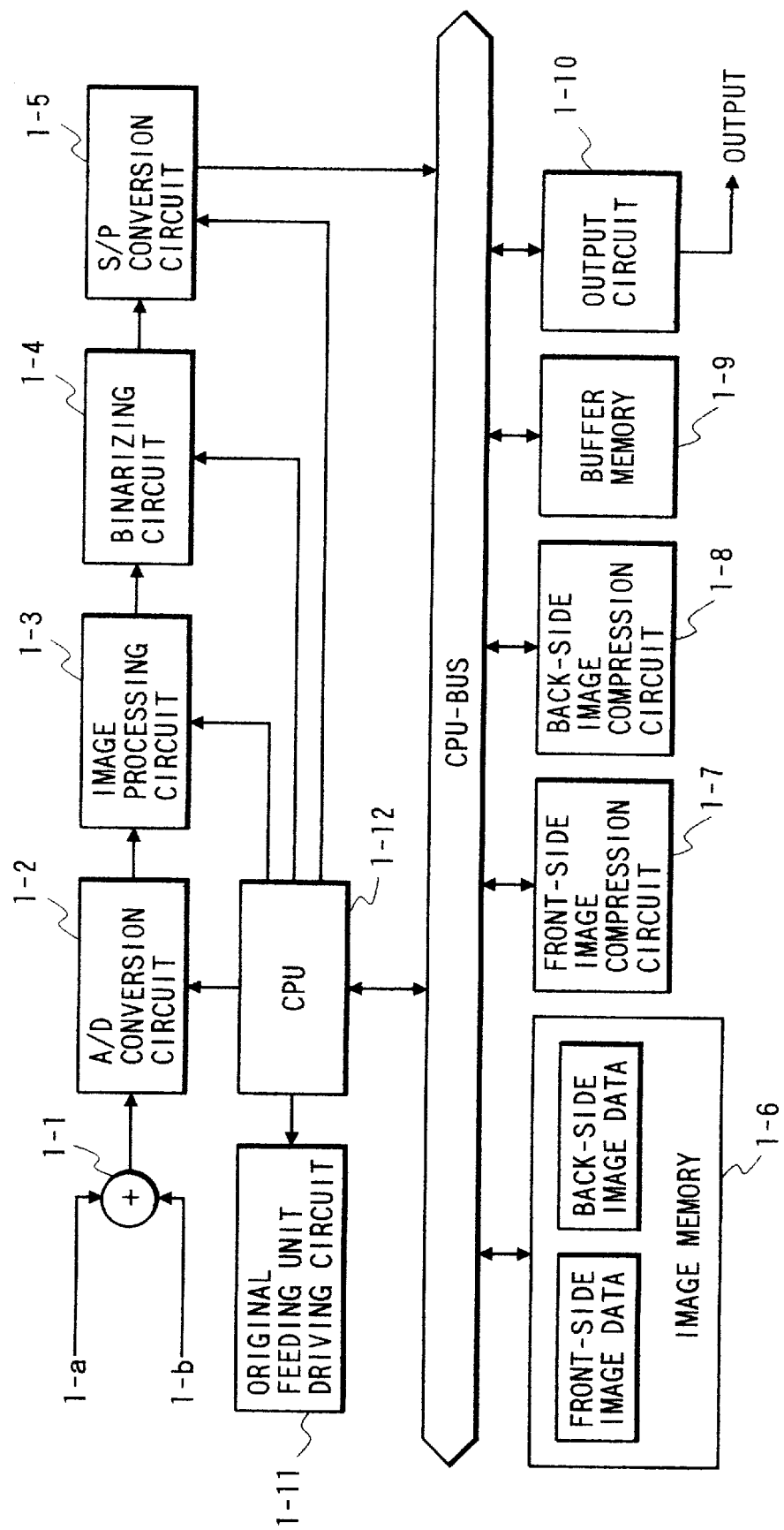
FIG. 3 is a block diagram showing the arrangement of an image reading apparatus according to the first embodiment of the present invention.
Figure 4:
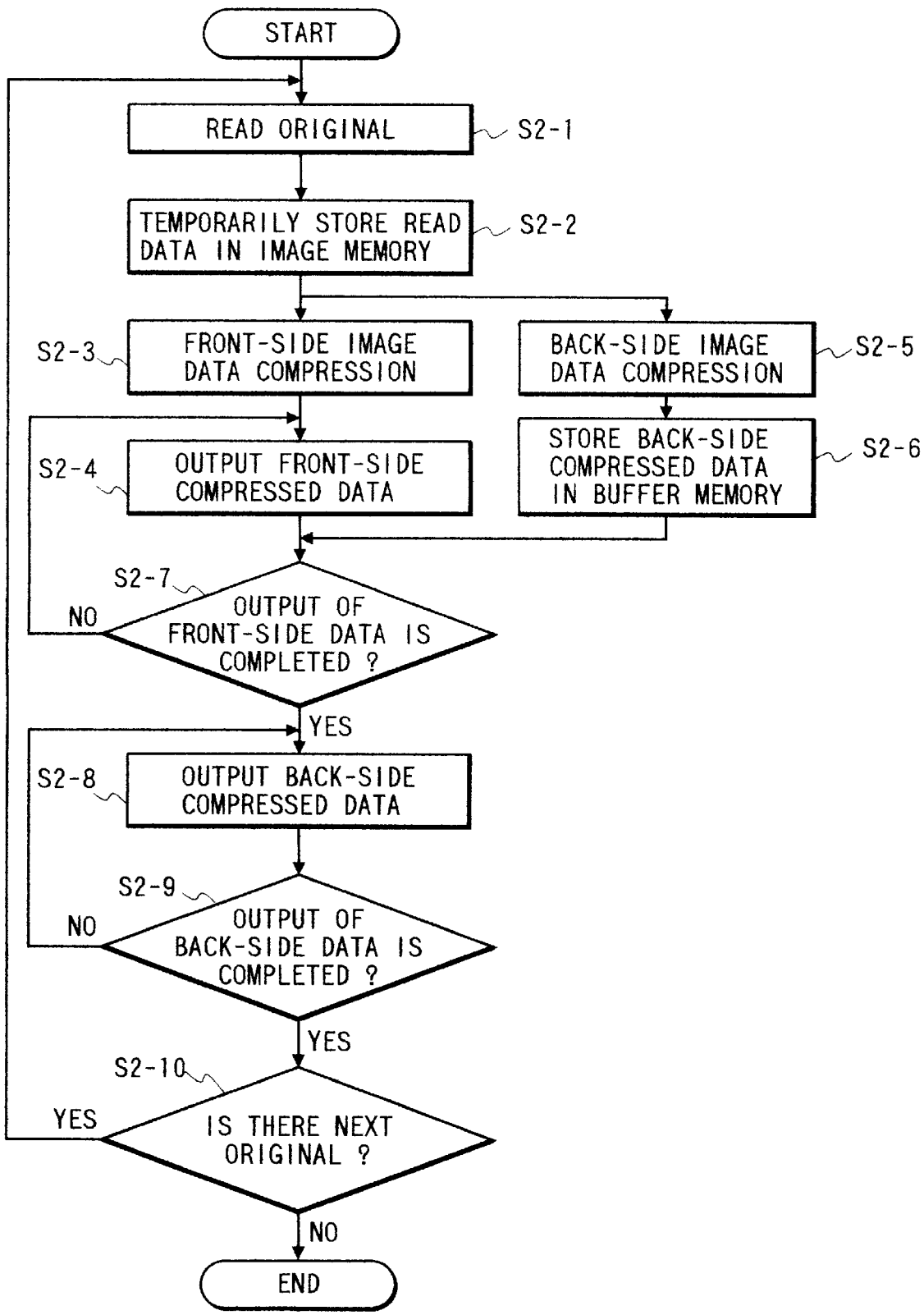
FIG. 4 is a flow chart for explaining the operation of the image reading apparatus of the first embodiment.
Figure 5:
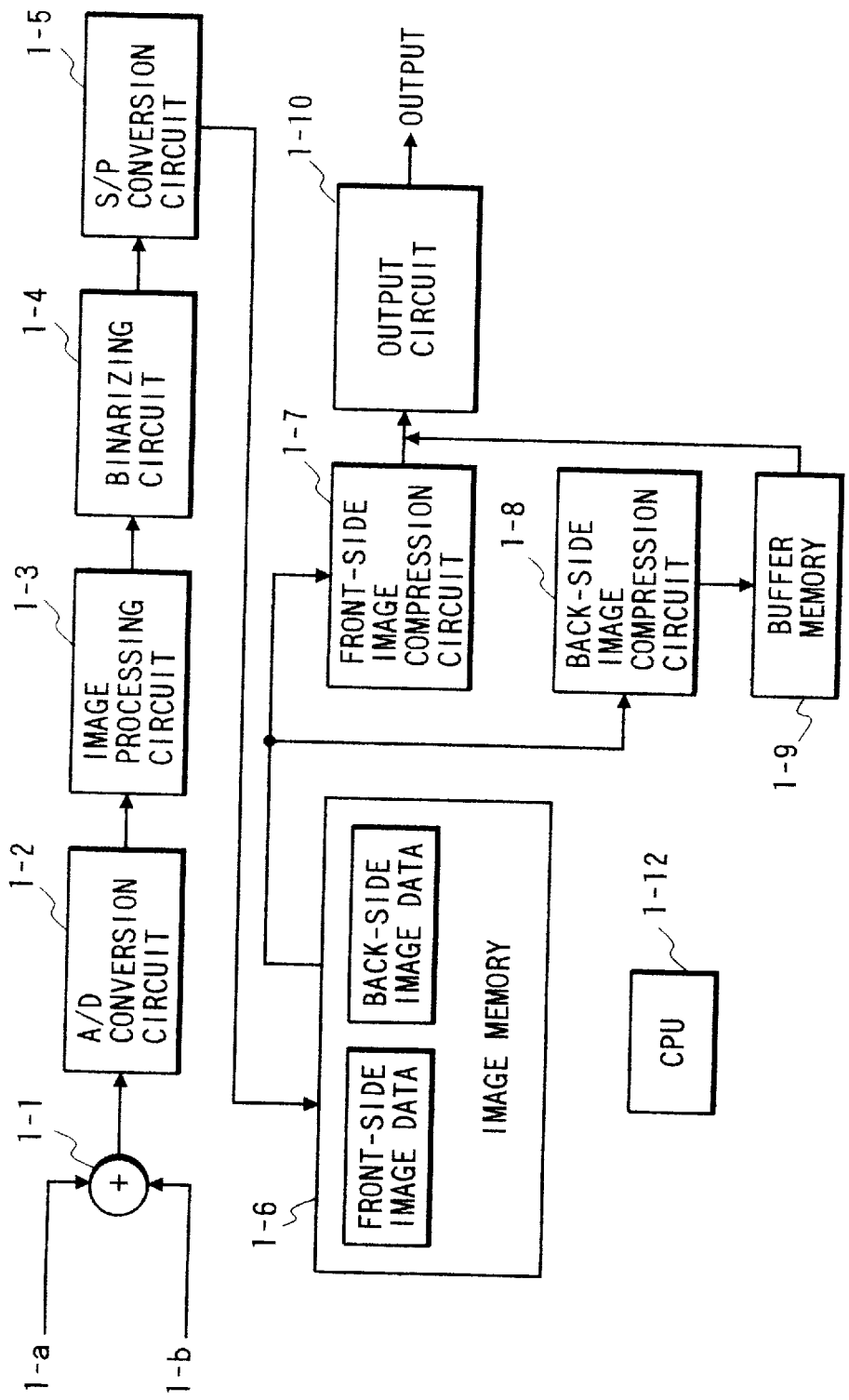
FIG. 5 is a block diagram for explaining the flow of data in the image reading apparatus of the first embodiment.

FIG. 3 is a schematic block diagram showing the arrangement of an image reading apparatus according to the first embodiment of the present invention, FIG. 4 is a flow chart showing the flow of signal processing of the image reading apparatus shown in FIG. 3, and FIG. 5 is a block diagram showing the flow of data in the image reading apparatus shown in FIG. 3. Since an original feeding unit and an image reading unit in the image reading apparatus of this embodiment have the same arrangement as that shown in FIG. 1, a detailed description thereof will be omitted.

As shown in FIG. 3, the image reading apparatus of this embodiment comprises a synthesizing circuit 1—1 for synthesizing input image signals 1-a and 1-b on both the front and back sides of an original, an analog-to-digital (A/D) conversion circuit 1-2 for converting the synthesized analog image signal into digital image data, an image processing circuit 1-3 for performing signal processing (e.g., shading correction, γ correction, edge emphasis, and the like) of the converted digital image data, a binarizing circuit 1-4 for converting the processed image data into binary data representing two values (black and white), a serial-to-parallel (S/P) conversion circuit 1-5 for converting the binary serial data into parallel data corresponding to the bus width of a CPU 1-12, an image memory 1-6 for temporarily storing the converted image data, a front-side image compression circuit 1-7 for compressing an image on the front side of an original, a back-side image compression circuit 1-8 for compressing an image on the back side, a buffer memory 1-9 for temporarily storing the image on the back side, an output circuit 1-10 for outputting compressed image data from the image memory 1-6 and the buffer memory 1-9, an original feeding unit driving circuit 1-11 for driving an original feeding unit, and the CPU 1-12 for controlling these circuits.

The flow of image data in the image reading apparatus shown in FIG. 3 will be described below with reference to FIGS. 4 and 5.

In step S2-1 in FIG. 4, images on the front and back sides of a fed original are simultaneously read by linear sensors, and an image signal 1-a of the read image on the front side and an image signal 1-b of the read image on the back side are synthesized by the synthesizing circuit 1—1. The synthesized signal is converted into digital image data by the A/D conversion circuit 1-2. The image data is subjected to processing such as shading correction, γ correction, edge emphasis, and the like in the image processing circuit 1-3, and the processed signal is binarized by the binarizing circuit 1-4. The binary signal is converted into parallel data by the S/P conversion circuit 1-5, and the parallel data is output.

The parallel data is temporarily stored in the image memory 1-6 (step S2-2). The front-side image data is compressed by the front-side image compression circuit 1-7 (step S2-3), and is output via the output circuit 1-10 (step S2-4). On the other hand, the back-side image data is compressed by the back-side image compression circuit 1-8 (step S2-5), and the compressed data is stored in the buffer memory 1-9 (step S2-6).

When the reading operation of the original has been completed, and the output processing of all the compressed data of the front-side image has been completed (step S2-7), the compressed data of the back-side image is output (step S2-8). Upon completion of the output processing of the back-side image data (step S2-9), image data stored in the image memory 1-6 can be cleared. The image reading apparatus reads the next original, and if there is no original to be read next, the image reading processing ends (step S2-10).

Since the image reading apparatus can perform the reading and compression processing of back-side image data of an original simultaneously with such processing of front-side image data, the time for which the apparatus requires the back-side image data stored in the image memory 1-6 can be shortened, and hence, the reading processing of the next original can be started earlier, resulting in a high original reading speed.

In the second embodiment, image data on the front and back sides of an original are compressed in a software manner. When image data is compressed in a hardware manner as in the first embodiment, it is possible to end compression at the time of reading an image due to the high compression processing speed. However, if an apparatus such as a computer which receives the output from the image reading apparatus has poor processing performance, since a long time period is required from when the compressed data of a front-side image is output until the compressed data of a back-side image is output, the compression speed of the back-side image data can be low. In this case, when back-side image data is compressed in a software manner using the CPU that controls the respective circuits, higher-speed reading processing can be realized by adding only a buffer memory to the conventional image reading apparatus.

Figure 6:
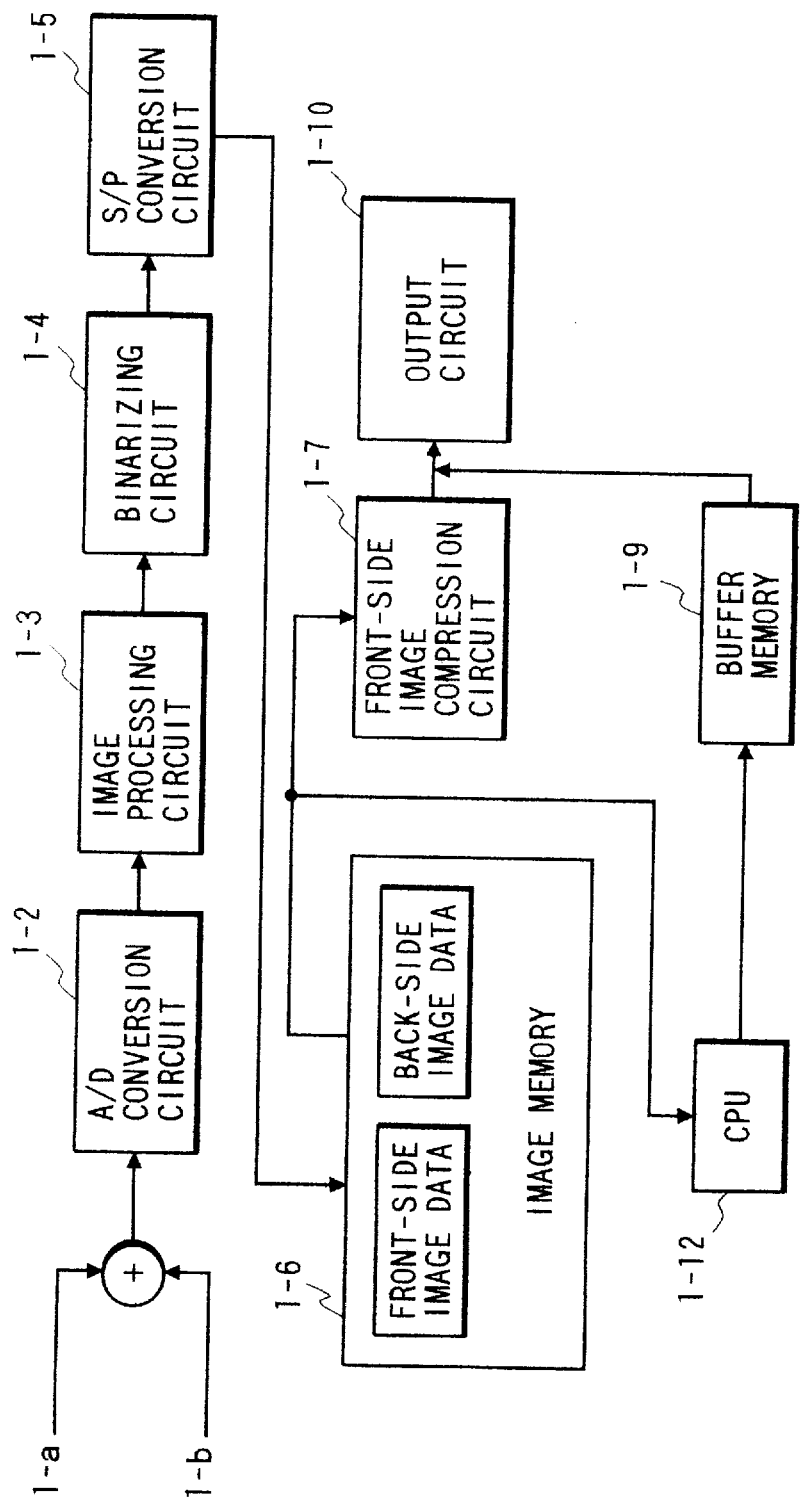
FIG. 6 is a block diagram showing the arrangement of an image reading apparatus according to the second embodiment of the present invention.

Therefore, the arrangement of the image reading apparatus of the second embodiment is substantially the same as that of the first embodiment shown in FIG. 3, except that the back-side image compression circuit 1-8 is omitted, and its flow chart is the same as that of the first embodiment shown in FIG. 4. In this case, the back-side image data is compressed via the CPU 1-12 and is then supplied to the buffer memory 1-9, as shown in FIG. 6. Note that the same reference numerals in FIG. 6 denote the same parts as in FIG. 3, and a detailed description thereof will be omitted.

In the second embodiment, only the back-side image data can have a low processing speed. In recent years, since the CPU has a very high processing speed, image data on both the front and back sides may be simultaneously compressed by multitask processing in a software manner although high cost is still required. In this case as well, since the compression speed of the back-side image data can be lower than that of the front-side image data, it is efficient to set the priority of processing of the front-side image data to be higher than that of the back-side image data.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:

a) a first line sensor;

b) a second line sensor;

c) first compression means for compressing an output from said first line sensor and outputting first compression data;

d) second compression means for compressing an output from said second line sensor and outputting second compression data, said first compression means being able to operate at a higher speed than said second compression means; and e) control means for controlling so as to perform, in parallel, a compression operation by said first compression means and a compression operation by said second compression means and to start outputting said second compression data after output of said first compression data is completed.

2. An apparatus according to claim 1, further comprising storage means for storing said second compression data.

3. An apparatus according to claim 1, wherein said second compression means compresses image data in a different manner from that of said first compression means.

4. An apparatus according to claim 3, further comprising storage means for storing said second compression data.

5. An apparatus according to claim 4, wherein said first and second compression means simultaneously start compression of the image data.

6. An apparatus according to claim 5, wherein said first compression means performs compression in a hardware manner, and said second compression means performs compression in a software manner.

7. An apparatus according to claim 1, wherein said first and second compression means simultaneously compress the image data to be output from said first line sensor and the image data to be output from said second line sensor by multitask processing.

8. An apparatus according to claim 7, wherein said first and second compression means are controlled so that priority of compression by said first compression means is set higher than priority of compression by said second compression means.

* * * * *